United States Patent
Nakagawa

(10) Patent No.: US 7,923,887 B2
(45) Date of Patent: Apr. 12, 2011

(54) BRUSHLESS MOTOR

(75) Inventor: Yukinori Nakagawa, Osakabu (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 315 days.

(21) Appl. No.: 12/338,018

(22) Filed: Dec. 18, 2008

(65) Prior Publication Data

US 2009/0160287 A1    Jun. 25, 2009

(30) Foreign Application Priority Data

Dec. 20, 2007    (JP) .................................. 2007-329382

(51) Int. Cl.
*H02K 1/08* (2006.01)
*H02K 1/14* (2006.01)

(52) U.S. Cl. ... 310/216.057; 310/216.058; 310/216.074; 310/216.091; 310/215; 310/156.28

(58) Field of Classification Search .......... 310/156.28–156.29, 156.33–156.34, 310/216.057–216.058, 216.064–216.094, 310/216.106–216.114, 214, 215

See application file for complete search history.

(56) References Cited

U.S. PATENT DOCUMENTS

| 6,809,442 B2 * | 10/2004 | Kaneko et al. ................... 310/58 |
| 7,737,598 B2 * | 6/2010 | Ionel et al. ............. 310/216.058 |
| 2004/0145267 A1 * | 7/2004 | Lowry et al. .................. 310/215 |
| 2004/0245887 A1 * | 12/2004 | Fujinaka ....................... 310/254 |

FOREIGN PATENT DOCUMENTS

| JP | 5-111233 | 4/1993 |
| JP | 2006-61326 | 3/2006 |

* cited by examiner

*Primary Examiner* — Quyen Leung
*Assistant Examiner* — Leda Pham
(74) *Attorney, Agent, or Firm* — Staas & Halsey LLP

(57) ABSTRACT

Disclosed herein is a brushless motor that is simply constructed based on a vernier type motor to achieve high torque without the increase in size and complication thereof. The brushless motor includes a rotor having magnetized surfaces alternately magnetized as N and S poles and a stator having salient poles. The salient poles have tip end surfaces opposite to the magnetized surfaces in the radial direction. Grooves and protrusions are alternately formed at the tip end surfaces of the salient poles in the rotational direction. The grooves and the protrusions extend in the axial direction and have a width in the rotational direction approximately equal to that of the N pole or the S pole. Magnetic bodies are disposed in gaps defined between the grooves and the magnetized surfaces in a non-contact fashion. A magnetic connection member is spaced apart from the stator to interconnect the magnetic bodies.

7 Claims, 12 Drawing Sheets

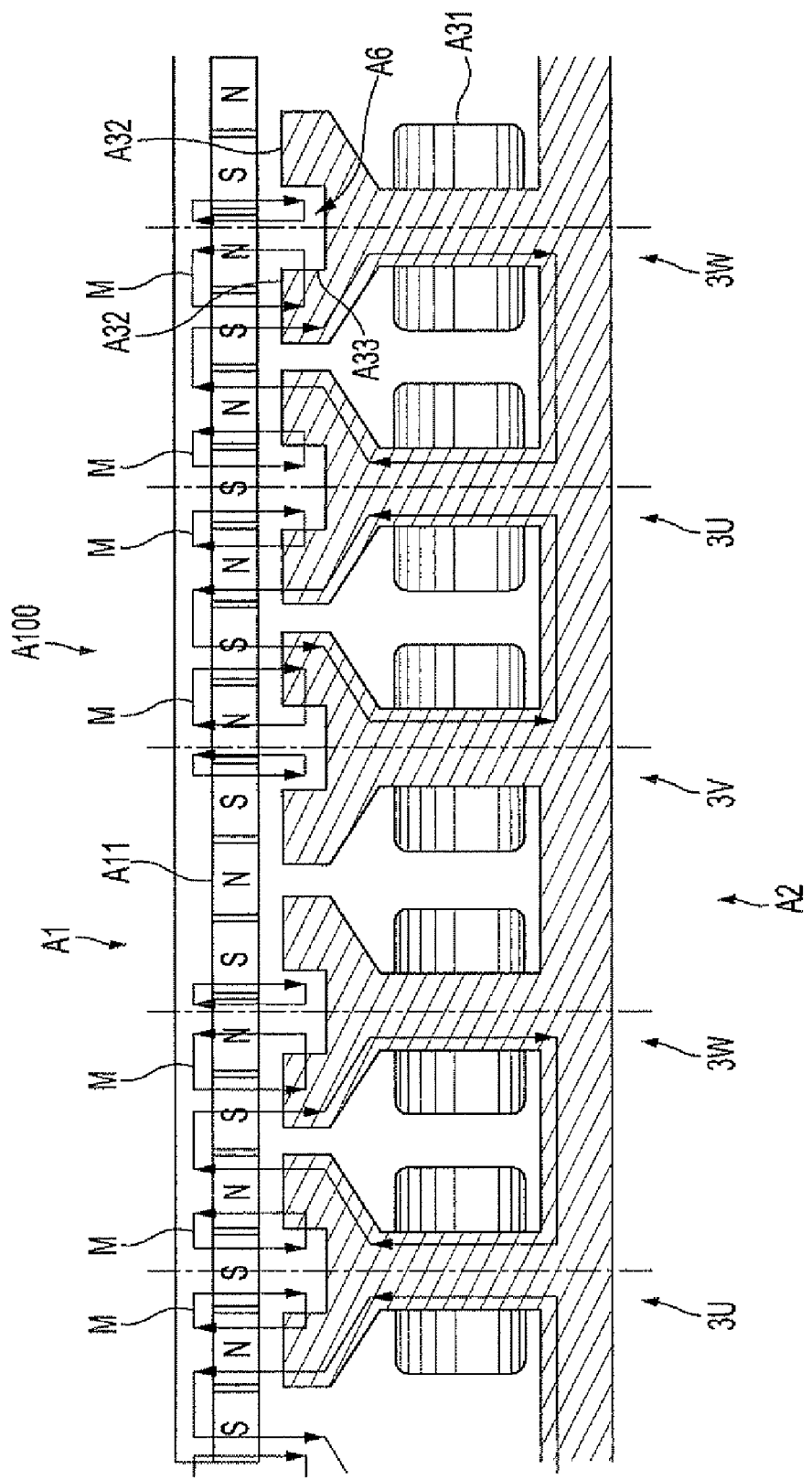

BRUSHLESS MOTOR

CROSS-REFERENCE TO RELATED APPLICATION

This application claims the benefit of Japanese Patent Application No. 2007-329382, filed on Dec. 20, 2007 in the Japanese Intellectual Property Office, the disclosure of which is incorporated herein by reference.

BACKGROUND OF THE INVENTION

1. Field of the Invention

The present invention relates to a brushless motor that is inexpensive and has greatly improved output torque.

2. Description of the Related Art

Attempts have been made to improve the performance of a brushless motor by improving the performance of a magnet, using a low-loss iron core material, or improving a coil fill factor, and thus reducing copper loss. For example, a direct drive motor for washing machines is directly connected to a load with an acceleration/deceleration mechanism, such as a gear, not being provided at an output shaft of the motor. Consequently, it is necessary for the motor to output large torque at a low speed considering the characteristics of the load. To this end, it is necessary to restrain the increase of temperature at a low-speed operation. In the related art, the motor is multipolarized (for example, 48 poles for a rotor and 36 slots for a stator) to shorten the circumferential length of coils of the stator and reduce a resistance value. That is, when one equivalent coil is equally designed, one equivalent resistance value is reduced by increasing poles (slots) of the stator, such that the thickness of the teeth is reduced as compared with non-multipolarization, and the circumferential length per turn of a coil is shortened as much as the thickness of the teeth.

Also, a demand to increase the torque and decrease the costs of the brushless motor has risen, and the correspondence based on the above-described construction has reached the limit. For these reasons, therefore, there has been developed a brushless motor of which the basic structure is greatly modified in recent years. For example, a vernier type motor mainly used for a stepping motor (see Japanese Patent No. 3140814) is considered to be applied to a brushless motor disclosed in Japanese Patent Application Publication No. 2006-61326.

As shown in FIG. 12, a brushless motor A100 includes a rotor A1 having magnetized surfaces A11 alternately magnetized as N and S poles in the rotational direction and a stator having a plurality of salient poles A3 on each of which a coil A31 is wound. The salient poles A3, which are driven at a different phase, are offset from the N and S poles. Tip end surfaces of the salient poles A3 are opposite to the magnetized surfaces A11 in the radial direction. At each tip end surface are alternately formed a groove A33 and protrusions A32 extending in the axial direction and having a width in the rotational direction approximately equal to that of the N pole or the S pole. The coil A31 of the corresponding salient pole A3 is electrically conducted, depending upon the position of the rotor A1, to rotate the rotor A1.

In this structure, a gap A6 between each groove A33 and the corresponding magnetized surface A11 is greater than a gap A6 between each protrusion A32 and the corresponding magnetized surface A11, with the result that magnetic flux linked to each tooth is improved, and high torque is achieved as compared to the conventional brushless motor A100 in which the salient poles A3 are opposite to the respective poles although the brushless motor has the same coil (the number of windings of one equivalent coil) (See FIG. 12).

However, the brushless motor A100 disclosed in Japanese Patent Application Publication No. 2006-61326 has difficulty achieving high torque. As shown in FIG. 12, for example, the gap distance between each S pole opposite to the center of a U-shaped coil and the corresponding salient pole A3 in the radial direction is greater than that between the N poles at opposite sides of the S pole. As a result, magnetic flux of the S pole is generated, although the magnetic flux of the S pole is not greater than that of the N poles, and the magnetic flux of the S pole becomes leakage magnetic flux M flowing to the N poles at the opposite sides of the S pole. This leakage magnetic flux M greatly reduces effective magnetic flux linked to the U-shaped coil.

SUMMARY OF THE INVENTION

Therefore, it is an aspect of the invention to provide a brushless motor that is simply constructed based on a vernier type motor to achieve high torque without the increase in size and complication thereof.

In accordance with one aspect, the present invention provides a brushless motor including a rotor having magnetized surfaces alternately magnetized as N and S poles in a rotational direction, a stator having a plurality of salient poles on each of which a coil is wound, the salient poles having tip end surfaces opposite to the magnetized surfaces in the radial direction, grooves and protrusions alternately formed at the tip end surfaces of the salient poles in the rotational direction, the grooves and the protrusions extending in an axial direction and having a width in the rotational direction approximately equal to that of the N pole or the S pole, magnetic bodies disposed in gaps defined between the grooves and the magnetized surfaces not in contact with the grooves and the magnetized surfaces, and a magnetic connection member spaced apart from the stator in the axial direction to interconnect the magnetic bodies.

In the above-described structure, magnetic flux, exiting from the magnetized surfaces opposite to the corresponding grooves, forms a magnetic circuit through the magnetic bodies and the magnetic connection member, whereby it is possible to greatly reduce leakage magnetic flux flowing to the neighboring magnetized surfaces. As a result, it is possible to introduce magnetic flux, which is not introduced into the protrusions when the magnetic bodies and the magnetic connection member are not disposed, into the protrusions and thus increase effective magnetic flux linked to the coils. Consequently, it is possible to achieve high torque of the brushless motor.

Also, this effect may be achieved through a simple structure in which the magnetic bodies are disposed in the gaps of the respective grooves, and the magnetic bodies are connected to one another by the magnetic connection member.

To achieve high torque of the brushless motor, the magnetic connection member may be formed in the shape of a ring to interconnect the magnetic bodies.

To achieve high torque of the brushless motor, the magnetic bodies may be disposed in the respective gaps.

To reduce the costs necessary to prepare the magnetic bodies, the magnetic bodies may be disposed in the gaps at predetermined intervals.

To achieve high torque of the brushless motor, the magnetic connection member may include a plurality of magnetic connection members separated from one another, and the magnetic bodies may extend from the respective magnetic connection members.

To maintain the balance between forces applied to the magnetic connection member from a magnetic field in the motor through the magnetic bodies and, at the same time, to prevent the flow of an eddy current, the magnetic connection member may include a pair of magnetic connection members disposed at opposite sides of the stator such that the magnetic connection members are symmetrical to each other about the stator, and the magnetic bodies, having approximately the same shape, may extend from the respective magnetic connection members into the same gaps.

To maintain the balance between forces applied to the magnetic connection member from a magnetic field in the motor through the magnetic bodies, the magnetic connection member may include magnetic connection members extending from one end and the other end of the respective magnetic bodies in the axial direction such that the magnetic connection members extend in opposite directions in the rotational direction, and the magnetic connection members may be connected to magnetic bodies disposed at opposite sides of the respective magnetic bodies.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIG. 12 is a plan development view of a conventional brushless motor.

DETAILED DESCRIPTION OF THE PREFERRED EMBODIMENTS

Figure 1:
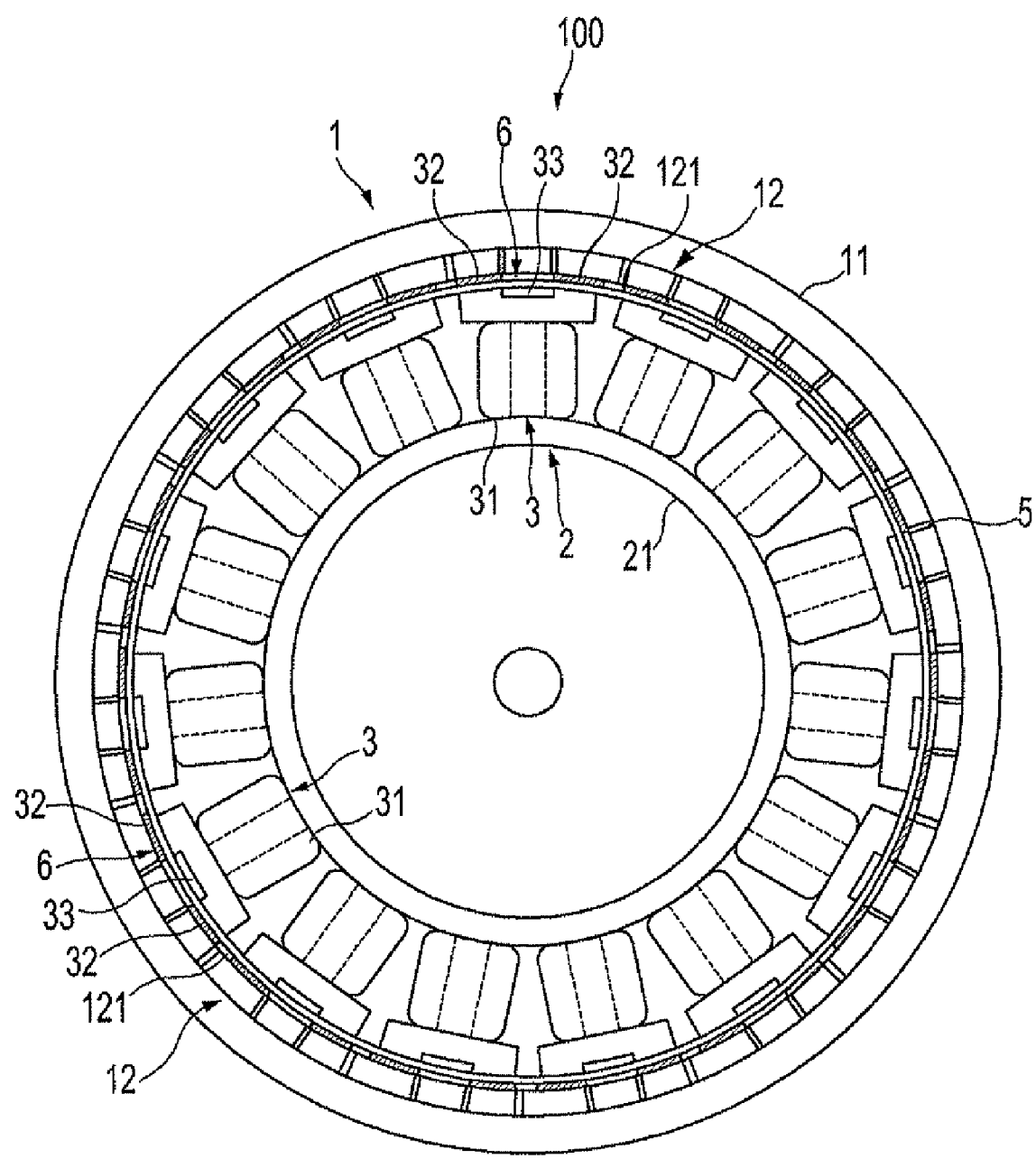
FIG. 1 is a typical view of a brushless motor according to an embodiment of the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

Figure 2:
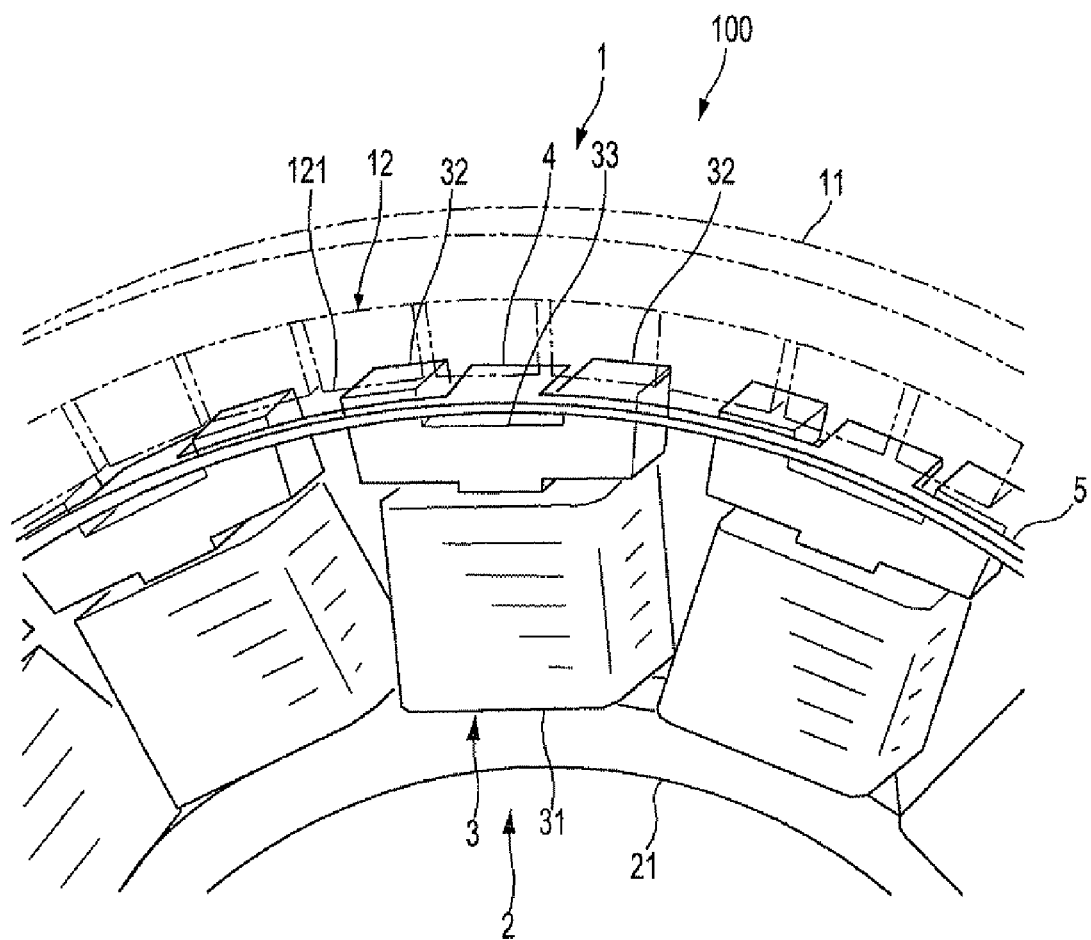
FIG. 2 is a typical perspective view of the brushless motor according to the an embodiment of the present invention.

As shown in FIGS. 1 and 2, a brushless motor 100 according to an embodiment includes a rotor 1, a stator 2, magnetic bodies 4 to reduce leakage magnetic flux, and a magnetic connection member 5 to magnetically interconnect the magnetic bodies 4. Magnetic flux flows in the magnetic connection member 5. Electrical conduction is achieved depending upon the positional relationship between the rotor 1 and the stator 2 to rotate the rotor 1.

The rotor 1 includes a ring-shaped back yoke 11 and permanent magnets 12 disposed at the inner circumference of the back yoke 11 approximately at the same interval in the circumferential direction.

The permanent magnets 12 have magnetized surfaces 121 disposed such that N and S poles are alternately directed in the radial direction. The number of poles is 50.

The stator 2 includes a ring-shaped central core 21 and salient poles 3 radially protruding from the core 21 at the same interval in the radial direction. The salient poles 3 are not in contact with one another. A total of 15 salient poles are disposed such that the salient poles are offset from the N and S poles. In this embodiment, the slot combination (the ratio in number of the salient poles 3 to the magnetized surfaces 121) is 3:10.

Each salient pole 3 includes a stay member extending in the radial direction and a circumferential protrusion circumferentially extending from the tip end of the stay member in opposite directions. Consequently, each salient pole 3 is formed approximately in the shape of T. A coil is wound on the stay member. In this embodiment, a groove 33 is formed at the middle of the tip end of the stay member. A coil 31 is wound on a stay portion of the stay member. Two protrusions 32 formed by the groove 33 are formed such that tip end surfaces of the protrusions 32 are opposite to the magnetized surfaces 121.

Each protrusion 32 has a width in the rotational direction of the rotor and an axial width approximately equal to those of each permanent magnet 12.

The groove 33 is formed in the axial direction to define a gap 6 between the groove 33 and the corresponding magnetized surface 121.

Figure 3:
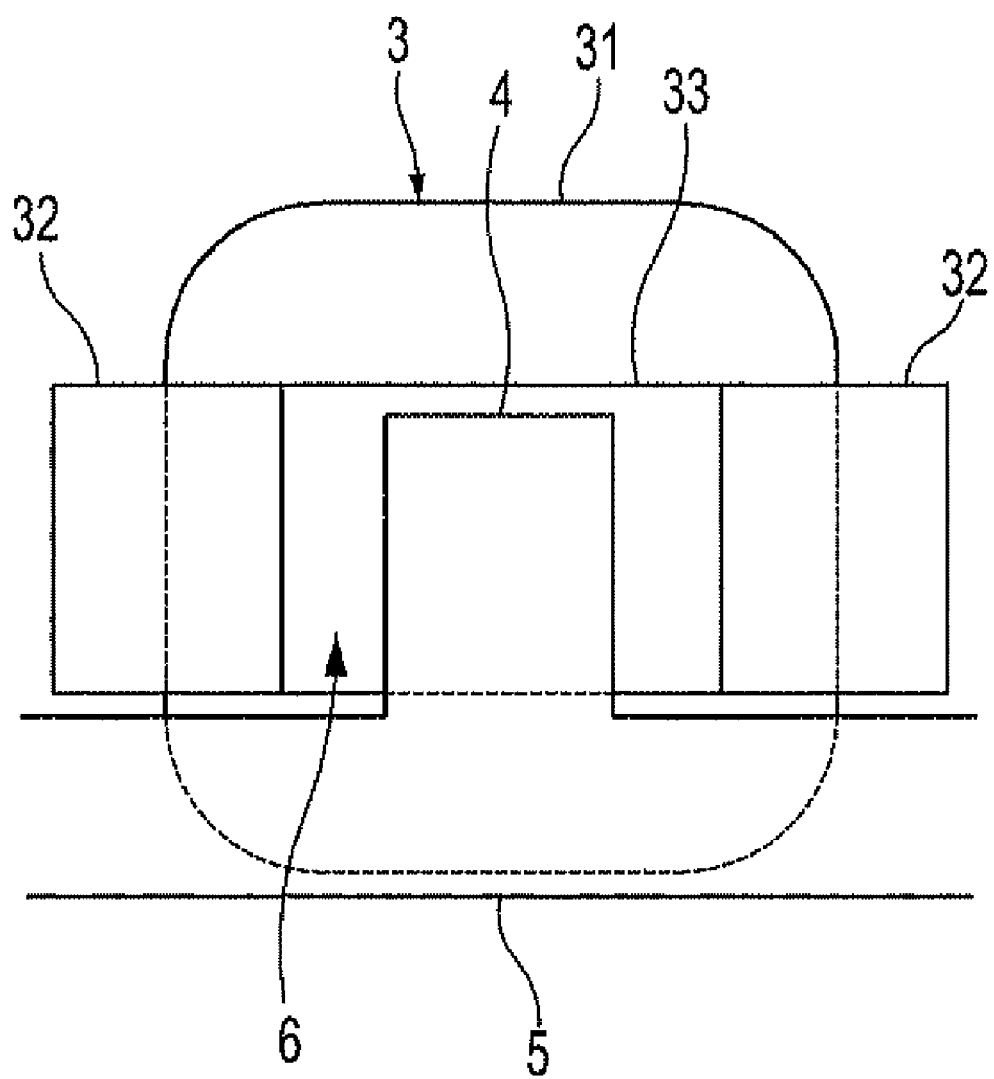
FIG. 3 is a typical view of the brushless motor according to the an embodiment of the present invention when viewed in the radial direction.
Figure 4:
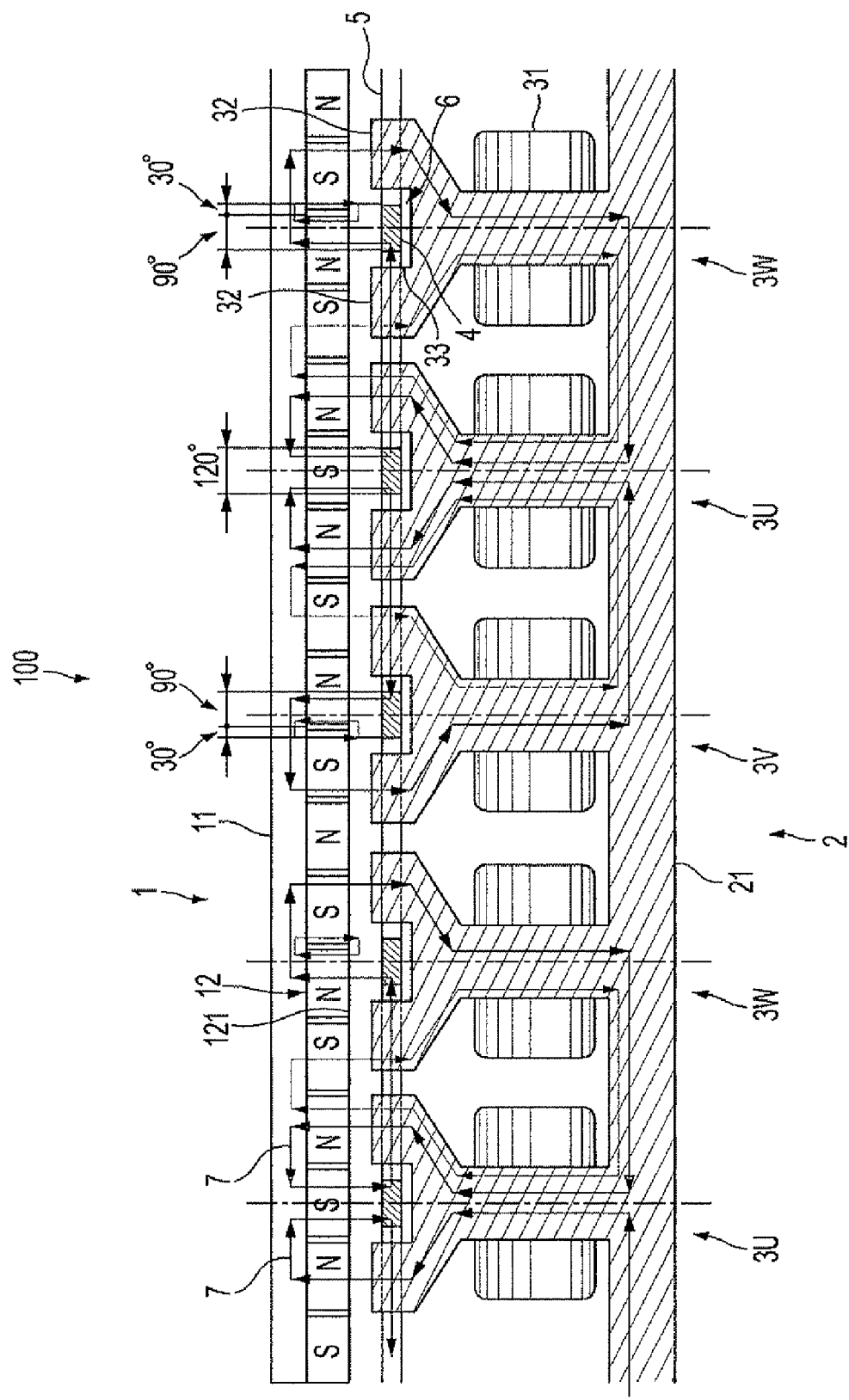
FIG. 4 is a plan development view of the brushless motor according to the an embodiment of the present invention.

As shown in FIGS. 3 and 4, each magnetic body 4 has an electrical angle of 120 degrees in the rotation direction and a length approximately equal to that of the groove 44 in the axial direction. Each magnetic body 4 is formed in the shape of a thin curved plate convex at the rotor 1 side thereof. Each magnetic body 4 is disposed in the groove 33 below an imaginary plane defined by the tip end surfaces of the protrusions 32. Each magnetic body 4 is spaced apart from opposite sides of the groove 33 by the same distance appropriate to reduce leakage magnetic flux. Each magnetic body 4 is disposed in a corresponding gap 6 such that the magnetic body 4 does not come into contact with the groove 33 and the magnetized surface 121.

The magnetic connection member 5 is formed in the shape of a ring physically and magnetically connected to the section of each magnetic body 4, extending over the respective protrusions 32 in the axial direction, and having the same thickness of each magnetic body 4. In this embodiment, the magnetic connection member 5 is fixed to the side of each protrusion 32 by a non-magnetic resin (not shown).

Hereinafter, magnetic flux generated from the magnetized surface 121 opposite to the groove 33 in this embodiment will be described in detail.

In FIG. 4, the brushless motor 100 according to this embodiment is developed in the shape of a straight line to enlargedly illustrate salient poles 3U, 3V, and 3W on which a U-shaped coil, a V-shaped coil, and a W-shaped coil are wound, respectively. A surface of the salient pole 3U, on which the U-shaped coil is wound, opposite to the groove 33 has an S pole.

Notice is taken of magnetic flux entering a part having a right electrical angle of 60 degrees of the magnetic body 4 disposed at the salient pole 3U, on which the U-shaped coil is wound, in the drawing.

Magnetic flux, exiting from the S pole, forms a magnetic circuit 7 in which the magnetic flux enters the magnetic body 4 disposed at the salient pole 3U, on which the U-shaped coil is wound, is directed from the magnetic body 4 disposed at the salient pole 3W, on which the W-shaped coil is wound, to the N pole opposite to the magnetic body 4 via the magnetic connection member 5, flows from the N pole to the S pole adjacent to the N pole, is introduced into the salient pole 3W, on which the W-shaped coil is wound, and is directed from the protrusion 32 of the salient pole 3U, on which the U-shaped coil is wound, to the N pole opposite to the protrusion 32 of the salient pole 3U.

Also, magnetic flux entering a part having a left electrical angle of 60 degrees of the magnetic body 4 disposed at the salient pole 3U, on which the U-shaped coil is wound, in the drawing forms a magnetic circuit 7 between the salient pole 3U, on which the U-shaped coil is wound, and the salient pole 3V, on which the V-shaped coil is wound.

When notice is taken of the magnetic body 4 disposed at the salient pole 3V, on which the V-shaped coil is wound, 30 degrees of 120 degrees are opposite to the S pole, and the remaining 90 degrees are opposite to the N pole. Only magnetic flux corresponding to 30 degrees exiting from the S pole counteracts the adjacent N pole.

When notice is taken of the magnetic body 4 disposed at the salient pole 3W, on which the W-shaped coil is wound, 30 degrees of 120 degrees are opposite to the N pole, and the remaining 90 degrees are opposite to the S pole. In the same manner as the salient pole 3V, only magnetic flux corresponding to 30 degrees exiting from the S pole counteracts the adjacent N pole.

In this embodiment with the above-stated construction, as shown in FIG. 4, magnetic flux, which may be counteracted by leakage magnetic flux when the magnetic body 4 is not disposed, may be greatly reduced by forming the magnetic circuit 7 in which the magnetic flux passes through the magnetic body 4 and the magnetic connection member 5.

As a result, the amount of effective magnetic flux entering the protrusion 32 and linked to the coil is increased, thereby achieving high torque of the motor.

Figure 5:
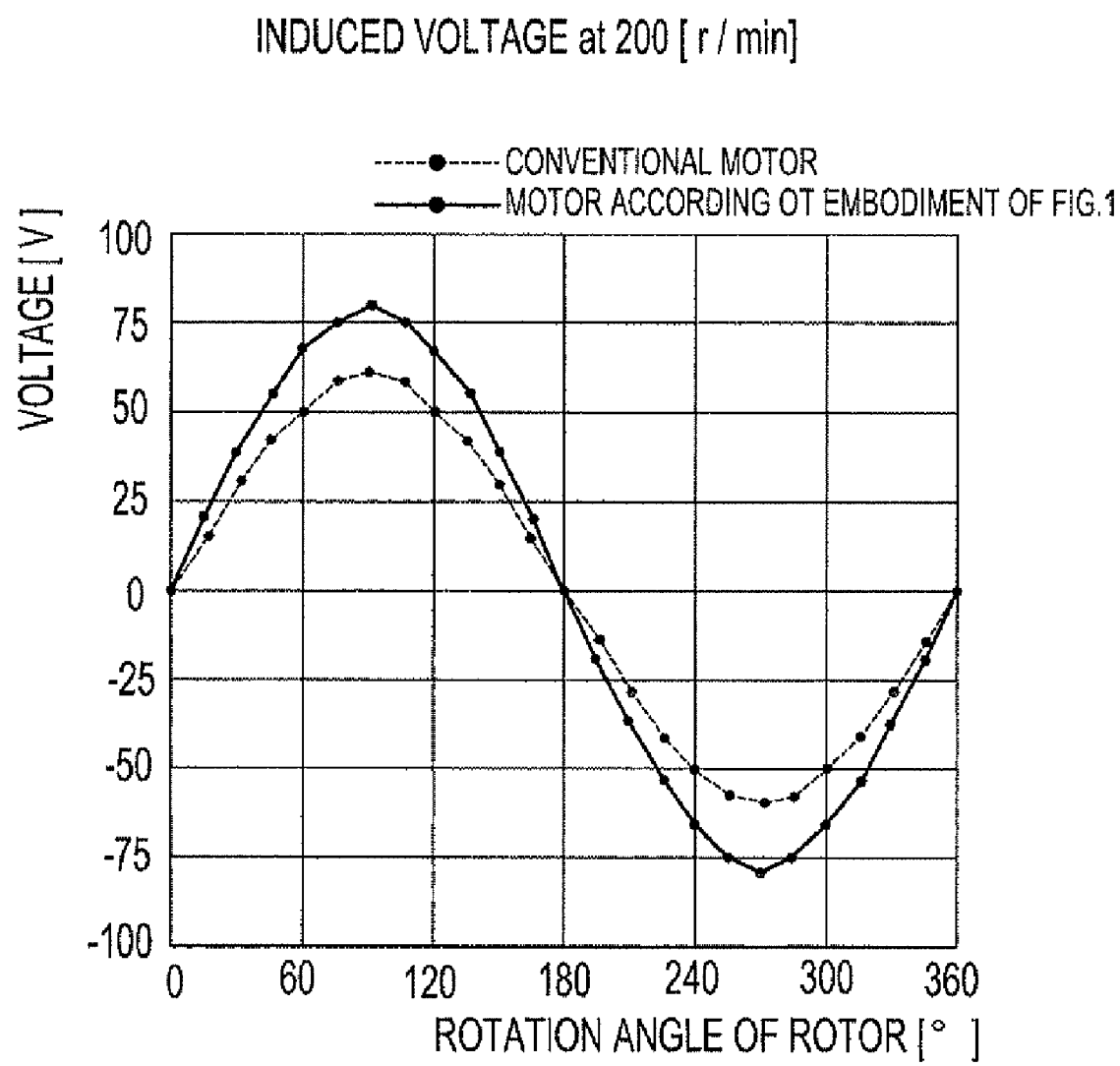
FIG. 5 is a graph illustrating an analysis result of induced voltage of the brushless motor according to the an embodiment of the present invention.

An analysis result of induced voltage of the motor when the motor is rotated at 200 rpm is illustrated in FIG. 5. In this embodiment, it is possible to increase the amount of effective magnetic flux linked to the coil, and therefore, it can be seen that the motor according to this embodiment has an induced voltage improved approximately 30% more than a motor having neither magnetic bodies 4 nor magnetic connection member 5.

Figure 6:
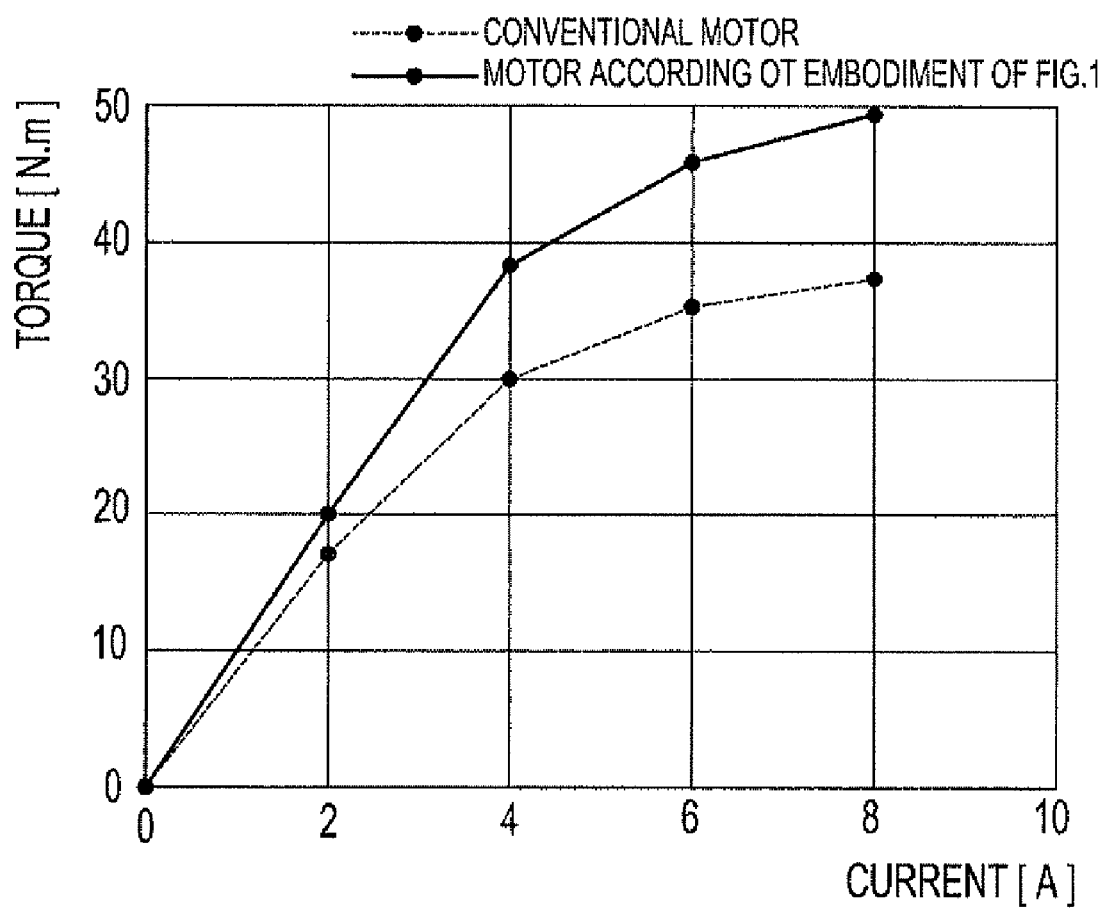
FIG. 6 is a graph illustrating an analysis result of a current-torque characteristic of the brushless motor according to the an embodiment of the present invention.

Also, it can be seen from an analysis result of a current-torque characteristic of the motor as shown in FIG. 6 that the motor according to this embodiment has a torque improved approximately 30% more than a conventional motor in the same current condition, and has a maximum output torque improved approximately 30% more than the conventional motor.

Also, since the magnetic bodies 4 are disposed in the gaps 6 defined between the grooves 33 and the rotor 1, the greatest improvement of torque is achieved, and a torque ripple due to the improvement of torque by only some of the salient poles does not occur.

In addition, such improvement of torque may be achieved simply by disposing the magnetic bodies 4 and the magnetic connection member 5 at the conventional vernier type brushless motor 100.

Meanwhile, the magnetic connection member 5 may be fixed to the respective salient poles to improve the stiffness of the stator 2. As a result, for example, a natural frequency of the stator 2 increases, and oscillation of the stator 2 is difficult, thereby contributing to the noise reduction of the motor.

Hereinafter, another embodiment will be described. In the following description, elements of this embodiment corresponding to those of the previous embodiment are denoted by the same reference numerals.

Figure 7:
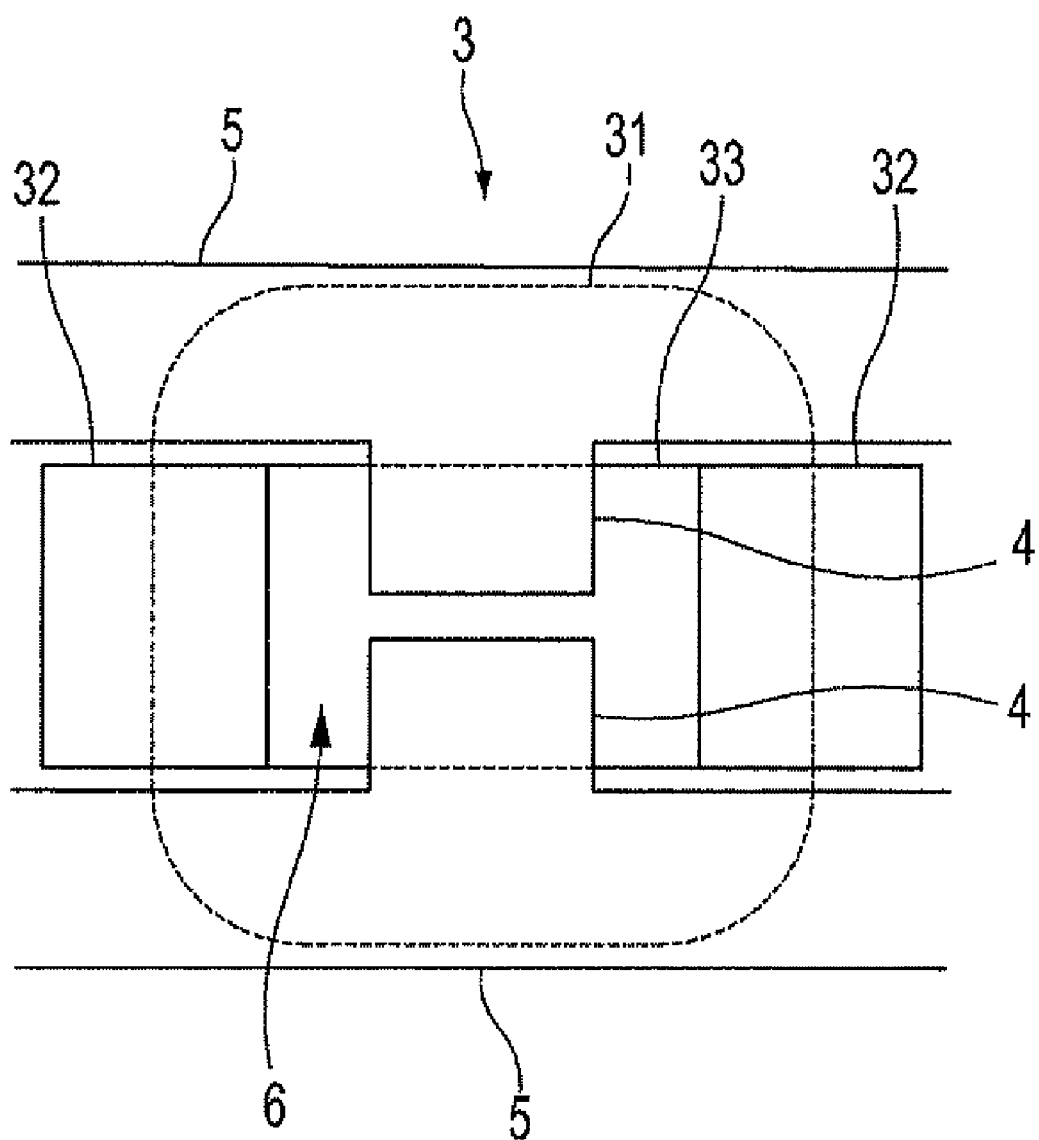
FIG. 7 is a typical view of a brushless motor according to another embodiment of the present invention when viewed in the radial direction.

In this embodiment, a brushless motor 100 is constructed in a structure in which a pair of magnetic connection members 5 are disposed at opposite sides of the stator 2 in the axial direction such that the magnetic connection members 5 are spaced a predetermined distance from each other, and magnetic bodies 4 having approximately the same shape extend from each magnetic connection member 5 into the same gap 6, as shown in FIG. 7 illustrating a salient pole 3 of the brushless motor 100 when viewed in the radial direction. The magnetic bodies 4 are not in contact with each other approximately at the middle of the stator 2 in the axial direction. The magnetic connection members 5 and the magnetic bodies 4, disposed vertically in the axial direction, are electrically separated from one another.

In this embodiment with the above-stated construction, it is possible to prevent the flow of an eddy current generated by the change of magnetic flux passing through the magnetic bodies 4.

Also, the magnetic bodies 4 and the magnetic connection members 5 are disposed with respect to the stator 2 in an axially symmetrical fashion, whereby it is possible to cancel a force applied to the magnetic bodies 4 and the magnetic connection members 5 by a magnetic field in the motor.

Hereinafter, another embodiment will be described. In the following description, elements of this embodiment corresponding to those of the embodiment previously described with reference to FIG. 3 are denoted by the same reference numerals.

Figure 8:
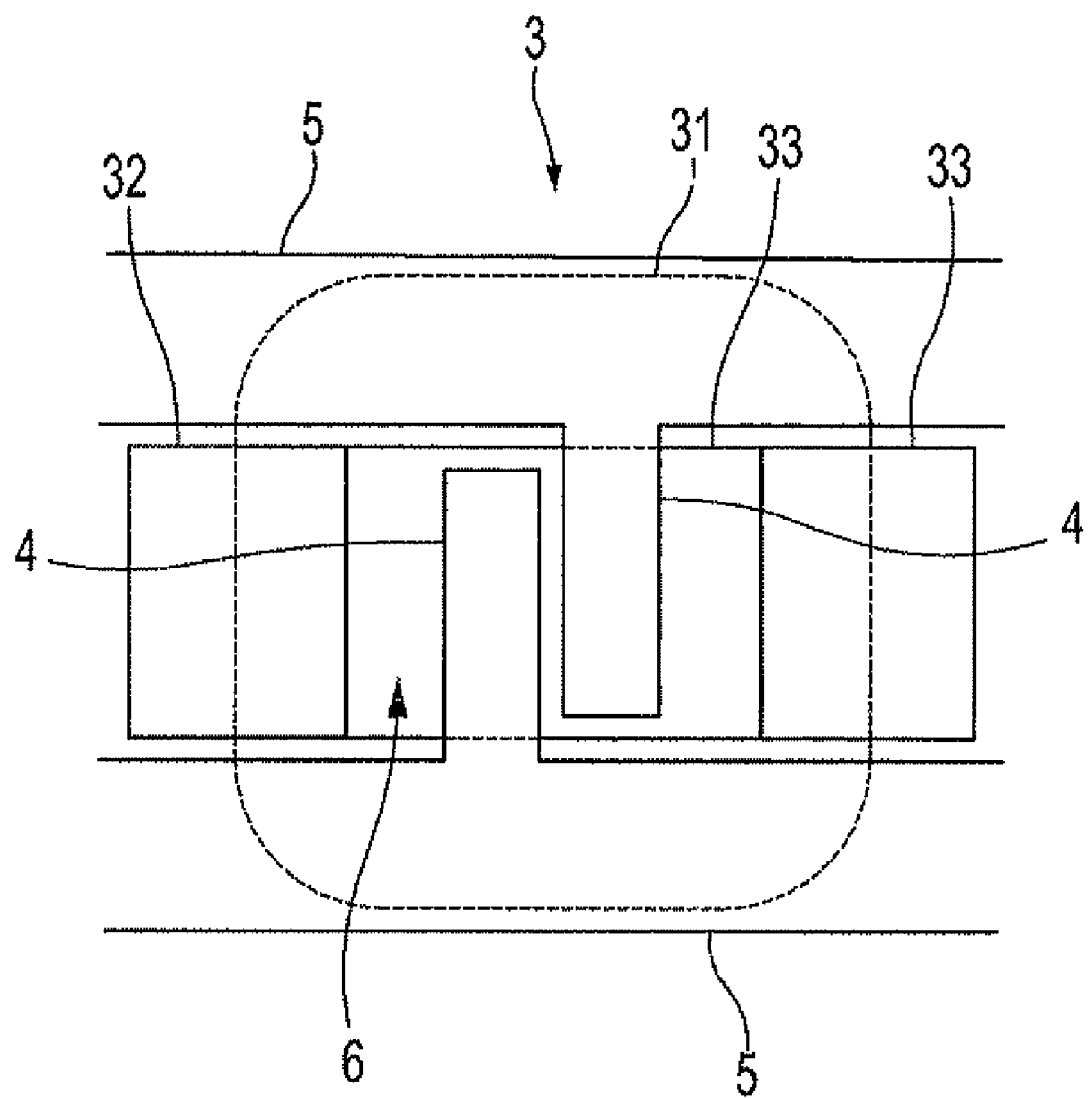
FIG. 8 is a typical view of a brushless motor according to another embodiment of the present invention when viewed in the radial direction.

In this embodiment, a brushless motor 100 is constructed in a structure in which a pair of magnetic connection members 5 are disposed at opposite sides of the stator 2 in the axial direction such that the magnetic connection members 5 are spaced a predetermined distance from each other, and magnetic bodies 4 having approximately the same shape extend from each magnetic connection member 5 into the same gap 6, as shown in FIG. 8 illustrating a salient pole 3 of the brushless motor 100 when viewed in the radial direction. The magnetic bodies 4 extend such that the magnetic bodies 4 deviate from each other in the rotational direction. Also, the magnetic bodies 4 are not in contact with each other.

The brushless motor 100 according to this embodiment may exhibit approximately the same effect as the brushless motor 100 according to the embodiment previously described with reference to FIG. 7.

Hereinafter, another embodiment will be described. In the following description, elements of this embodiment corresponding to those of the embodiment previously described with reference to FIG. 3 are denoted by the same reference numerals.

Figure 9:
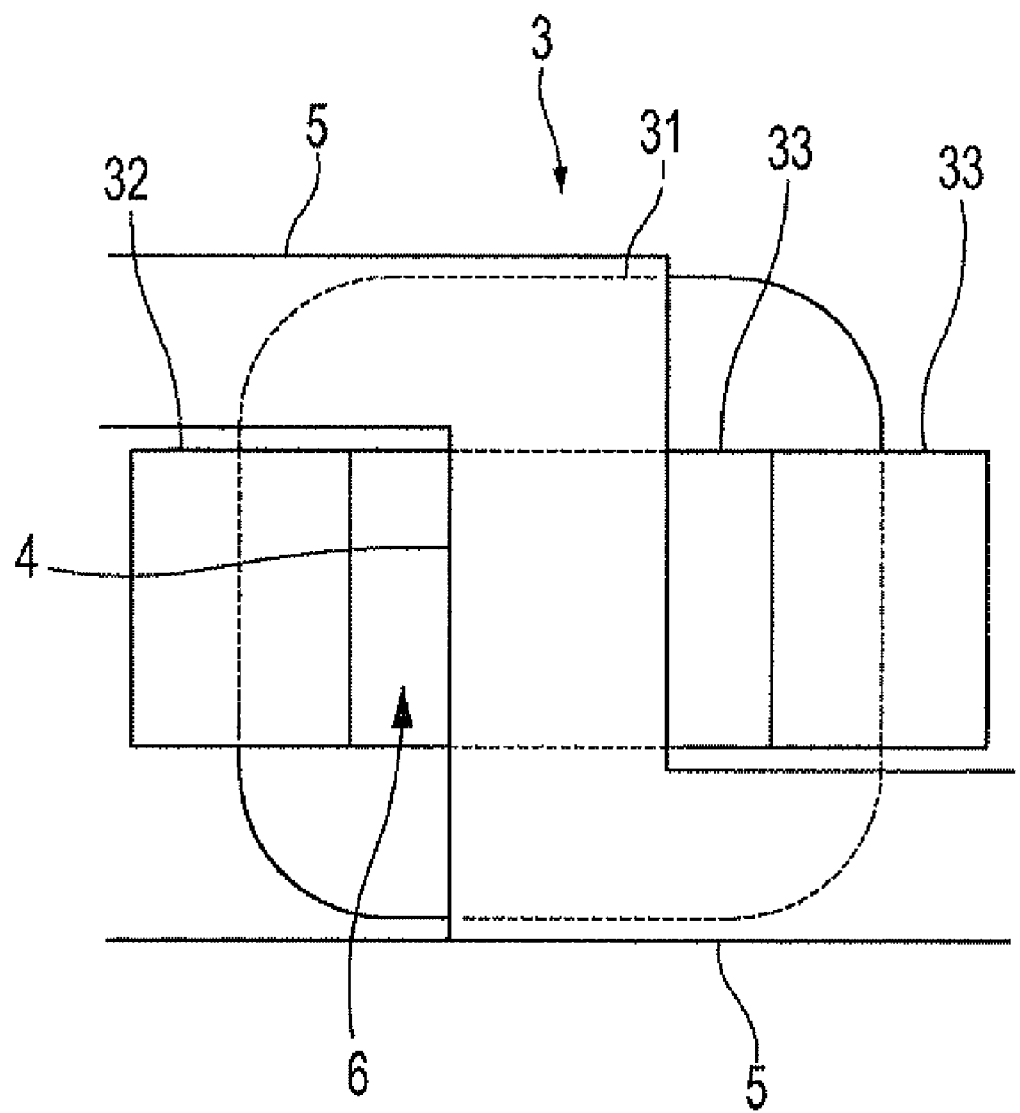
FIG. 9 is a typical view of a brushless motor according to another embodiment of the present invention when viewed in the radial direction.

In this embodiment, a brushless motor 100 is constructed in a structure in which magnetic connection members 5 extend from one end and the other end of a magnetic body 4 disposed in a gap 6 in the axial direction such that the magnetic connection members 5 extend in opposite directions in the rotational direction, and the magnetic connection members 5 are connected to magnetic bodies 4 disposed at opposite sides of the magnetic body 4, as shown in FIG. 9 illustrating a salient pole 3 of the brushless motor 100 when viewed in the radial direction.

In this embodiment, the magnetic body 4 and the magnetic connection members 5 are disposed with respect to the stator 2 in an axially symmetrical fashion, whereby it is possible to cancel a force applied to the magnetic bodies 4 and the magnetic connection members 5 by a magnetic field in the motor.

Hereinafter, a further embodiment will be described. In the following description, elements of this embodiment corresponding to those of the embodiment previously described with reference to FIG. 3 are denoted by the same reference numerals.

In this embodiment, the number of poles of a brushless motor 100 is 38, and the number of slots of the brushless motor 100 is 12. As shown in a plan development view of FIG. 10, the brushless motor 100 includes a plurality of salient pole pairs 3. A coil 31 is wound to the right on one of each salient pole pair 3, and another coil 31 is wound to the left on the other of each salient pole pair 3. Voltage having the same phase is applied to the coils 31 of the salient pole pair 3, and magnetic fluxes generated from the coils 31 are directed in opposite directions.

Figure 11:
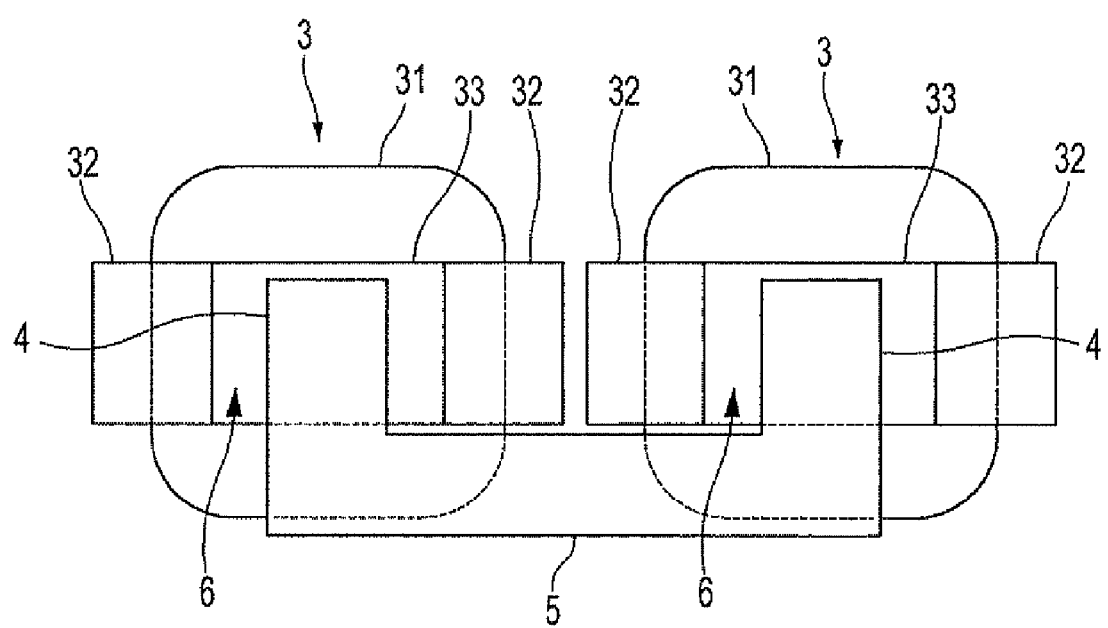
FIG. 11 is a typical view of a brushless motor according to the a further embodiment of the present invention when viewed in the radial direction.

In this embodiment, a plurality of magnetic connection members 5 are disposed such that the magnetic connection members 5 are separated from one another. A plurality of magnetic bodies 4 extend from the magnetic connection members 5 into different gaps 6. When notice is taken of a salient pole pair 3U and 3U', a magnetic connection member 5 is spaced apart from the stator 2 by a predetermined distance in the axial direction. The magnetic connection member 5 extends from a groove 33 formed at the salient pole 3U to another groove 33 formed at the salient pole 3U' in the circumferential direction. Magnetic bodies 4 having approximately the same shape extend from opposite ends of the magnetic connection member 5 into gaps 6 such that the magnetic bodies 4 have a length approximately equal to the axial length of the grooves 33. When viewed in the radial direction, the magnetic connection member 5 and the magnetic bodies 4 are configured in the shape of ']', as shown in FIG. 11.

This structure reduces leakage magnetic flux and improves torque of the brushless motor 100.

The present invention is not limited to the above-described embodiments.

It is possible to improve torque while reducing the costs related to the disposition of the magnetic bodies by disposing the magnetic bodies in the gaps at predetermined intervals. For example, it may be considered to dispose the magnetic bodies in every two or three gaps. At this time, a relationship between the slot combination and the positions of the magnetic bodies may be considered, such that torques generated between the salient pole group on which the U-shaped, V-shaped, and W-shaped coils are wounded, respectively, become uniform, to prevent the occurrence of a torque ripple.

In the above-described embodiments, the slot combination is 3:10. Alternatively, other slot combinations may be possible.

In the above-described embodiments, two protrusions and one groove are provided for one salient pole. Alternatively, one salient pole may be provided with three protrusions and two grooves disposed respectively between the protrusions.

In a structure in which the magnetic bodies and the magnetic connection member are made of a laminated steel sheet, it is possible to prevent the flow of an eddy current.

The magnetic connection member may be constituted by two members, which may be magnetically connected to each other.

Figure 10:
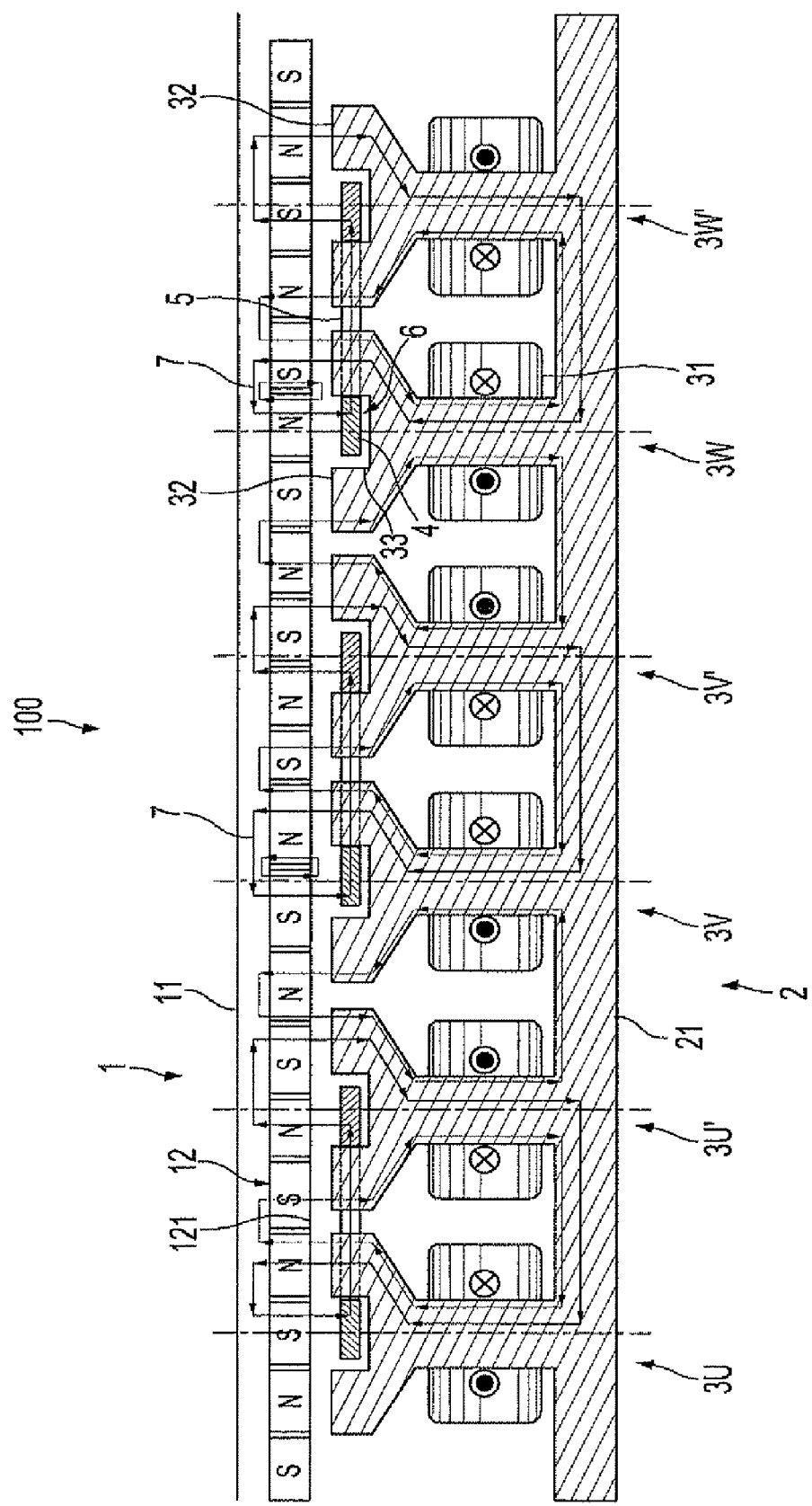
FIG. 10 is a plan development view of a brushless motor according to a further embodiment of the present invention.

In the embodiment shown in FIGS. 10 and 11, the magnetic connection members are disposed to interconnect the magnetic bodies disposed at the neighboring salient poles to which voltage having the same phase is applied. Alternatively, the magnetic connection members may interconnect the magnetic bodies disposed at the neighboring salient poles to which voltage having different phases is applied.

Of course, the respective magnetic bodies may be connected to a ring-shaped connection member even in a brushless motor having 38 poles and 12 slots.

Although a few embodiments of the present invention have been shown and described, it would be appreciated by those skilled in the art that changes may be made in this embodiment without departing from the principles and spirit of the invention, the scope of which is defined in the claims and their equivalents.

As apparent from the above description, magnetic flux, exiting from the magnetized surfaces opposite to the corresponding grooves, forms a magnetic circuit through the magnetic bodies and the magnetic connection member, whereby it is possible to greatly reduce leakage magnetic flux. Consequently, it is possible to increase effective magnetic flux linked to the coils and thus improve torque of the brushless motor. Also, it is possible to improve torque through a simple structure in which the magnetic bodies and the magnetic connection member are provided at the conventional brushless motor.

What is claimed is:

1. A brushless motor, comprising:
a rotor having magnetized surfaces alternately magnetized as N and S poles in a rotational direction;
a stator having a plurality of salient poles on each of which a coil is wound, the salient poles having tip end surfaces opposite to the magnetized surfaces in the radial direction;
grooves and protrusions alternately formed at the tip end surfaces of the salient poles in the rotational direction, the grooves and the protrusions extending in an axial direction and having a width in the rotational direction approximately equal to that of the N pole or the S pole;
magnetic bodies disposed in gaps defined between the grooves and the magnetized surfaces not in contact with the grooves and the magnetized surfaces; and
a magnetic connection member spaced apart from the stator in the axial direction to interconnect the magnetic bodies.

2. The brushless motor according to claim 1, wherein the magnetic connection member is formed in the shape of a ring to interconnect the magnetic bodies.

3. The brushless motor according to claim 1, wherein the magnetic bodies are disposed in the respective gaps.

4. The brushless motor according to claim 1, wherein the magnetic bodies are disposed in the gaps at predetermined intervals.

5. The brushless motor according to claim 1, wherein the magnetic connection member comprises a plurality of magnetic connection members separated from one another, and the magnetic bodies extend from the respective magnetic connection members.

6. The brushless motor according to claim 1, wherein the magnetic connection member comprises a pair of magnetic connection members disposed at opposite sides of the stator such that the magnetic connection members are symmetrical to each other about the stator, and the magnetic bodies, having approximately the same shape, extend from the respective magnetic connection members into the same gaps.

7. The brushless motor according to claim 1, wherein the magnetic connection member comprises magnetic connection members extending from one end and the other end of the respective magnetic bodies in the axial direction such that the magnetic connection members extend in opposite directions in the rotational direction, and the magnetic connection members are connected to magnetic bodies disposed at opposite sides of the respective magnetic bodies.

* * * * *